Dec. 1, 1964 R. B. GOODY 3,159,555
METHOD OF MAKING BUS BARS
Filed Aug. 11, 1961
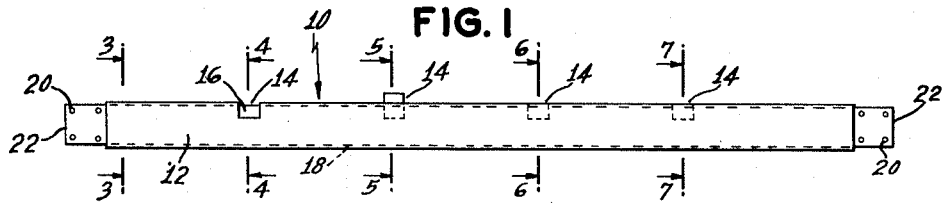
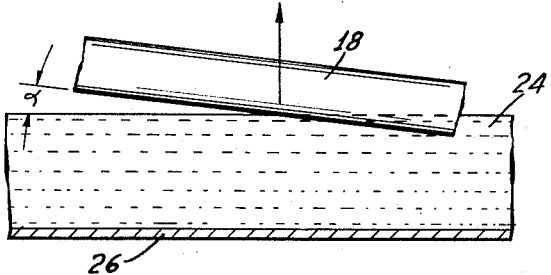
FIG. 3 FIG. 8 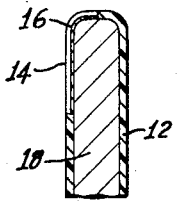 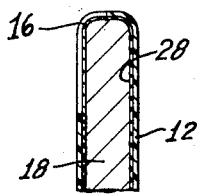
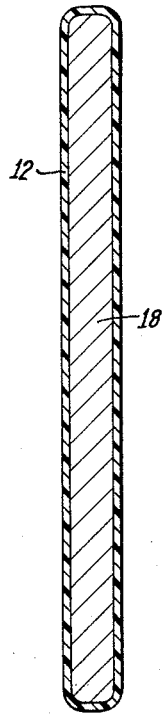 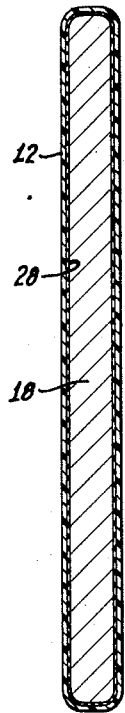
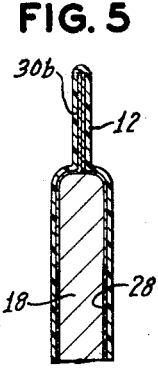
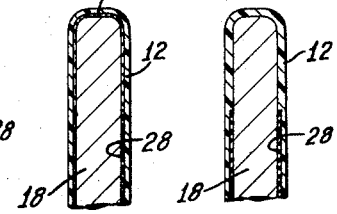
INVENTOR.
ROBERT B. GOODY
BY Richard M. Rabkin
ATTORNEY

3,159,555
METHOD OF MAKING BUS BARS

Robert B. Goody, Tenafly, N.J., assignor to Federal Pacific Electric Company, a corporation of Delaware
Filed Aug. 11, 1961, Ser. No. 130,797
8 Claims. (Cl. 204—15)

This invention relates to bus bars for use in bus duct employed in the distribution of electrical power. More particularly it relates to a novel bus bar having an insulating coating thereon.

Bus bars utilized in bus duct must often be fully insulated because of the small separation between the bars in the assembled duct. This is particularly critical in low impedance bus duct wherein the separation between closely spaced adjoining bars connected to different phases of the electric supply is small and the bars must be protected from one another. Bus bars have commonly been insulated by wrapping them with either single or plural layers of insulating tape. This approach is expensive and time consuming, particularly where there are offsets in the bar as in the low impedance bus duct illustrated in Patent No. 2,966,540 issued to Paul M. Christensen and assigned to the same assignee as the present invention.

Bus bars may advantageously be used to distribute as well as transmit power. When used as a part of a distribution network, plug-in units are used to provide convenient tap-offs from the bus duct to the local load. It has been customary to plate the bars with silver to reduce the contact resistance, both at the ends of the bars where connections to other bars are made by bolted joints and at bare contact areas provided for plug-in units. The bus bars herein referred to are sizeable. For example they may commonly measure a quarter inch by three to six inches in cross section by ten feet or more in length. Accordingly it is apparent that a considerable amount of silver has been used in plating each bar.

It is an object of this invention to provide a novel effective and economical method for manufacturing insulated bus bars. It is another object of this invention to provide a bus bar having an improved form of insulation. A related object resides in an improved method of insulating bus bars except at selected plural positions for engagement by plug-in unit.

It is still another object of this invention to provide improvements in bus bars having a heat fused thermoplastic insulating coating thereon with a view to improving the fabricating characteristics and in reducing the cost of producing such a bus bar. Certain features of the invention will be recognized as having broader application but, because the invention has particular merit in relation to this type of heat fusible type of bus bar insulation it is disclosed in that connection.

As will be seen from the detailed description below, an illustrative embodiment of the invention involves a bus bar having a seamless coating of insulating material except at certain selected areas. These areas are plated with silver or other high conductive material to reduce the contact resistance. A feature of the described method of producing the seamless insulation on bus bars includes the steps of masking portions of the bar which are to be bare, coating the bar and the masked portions with insulating material, removing the coating from the masked portions of the bar, and plating those portions. Where a heat fusible form of insulation is used the masked bar is heated to a temperature above the gelling temperature of the liquid insulation-forming material. Further steps include immersing the heated masked bar in the heat-fusible liquid insulation-forming material to produce gelling of the insulation on the heated bar, withdrawing the bar from the material, heating the coated bar at the fusing temperature of the material and retaining the bar at that temperature until the material thereon has fused into a homogeneous continuous seamless coating, stripping the fused coating from previously masked portions to provide bare areas, and electroplating a layer of silver to provide low contact resistance at the uncoated areas after the remainder of the bar has received the insulating coating.

The above and other objects, advantages and novel features of the invention will become apparent from the following description taken in conjunction with the drawings in which:

FIG. 1 is a side view of a bus bar having a fused coating thereon, including both masked and stripped areas;

FIG. 2 is a diagrammatic representation of a dipped bus bar emerging from a tank of heat-fusible liquid insulation-forming material;

FIG. 3 is a vertical cross-sectional view on a greatly enlarged scale of a portion of the insulated bus bar of FIG. 1 as viewed from the plane 3—3 of FIG. 1;

FIG. 4 is a fragmentary cross-sectional view of the insulated bus bar of FIG. 1 as viewed from the plane 4—4 of FIG. 1, illustrating a contact area;

FIG. 5 is a fragmentary vertical cross-sectional view of the bus bar of FIG. 1 as viewed from the plane 5—5 of FIG. 1 illustrating a masked insulated portion;

FIG. 6 is a fragmentary vertical cross-sectional view of the bus bar of FIG. 1 as viewed from the plane 6—6 of FIG. 1 illustrating another type of masked insulated portion;

FIG. 7 is a fragmentary vertical cross-sectional view of the bus bar of FIG. 1 taken in the direction 7—7 of FIG. 1 illustrating a contact area prior to stripping of the covering insulation;

FIG. 8 is a view similar to FIG. 3 of another embodiment of one feature of the invention; and FIG. 9 is a view similar to FIG. 4 of the embodiment shown in FIG. 8 illustrating a contact area.

Bus bars which are used in fabricating bus duct are commonly rigidly clamped in position in the duct enclosure by means of insulators which transmit the stresses on the bar and weight of the bar to the sheet metal enclosure. Such a structure is illustrated in the previously cited Christensen patent. When the bus duct is mounted with the length of the bus bar in the vertical direction, as in a riser, the duct is structurally supported and the bus bars and enclosure must be joined together securely to provide support for the bus bars. The material used to insulate the bus bar must therefor be resistant to slippage on the bar itself and must be tough enough to withstand being clamped between the bus bar and the insulated support in the bus duct without harmful deformation, flow, or tearing. Additionally the material used to coat the bus bars must be resistant to high temperatures so that it will not deteriorate at the operating temperature of the bus bar. Additionally, of course, the material must be an excellent electrical insulator, and be stable over long periods of time when exposed to a variety of industrial atmospheres. In some instances the bars must be bent to conform to a particular path. The bars are normally bent before they are covered with insulation. However, it has been found that the materials used for coating the bars are flexible and tough enough so that a straight bar can be first coated and then bent.

A material that has properties which fulfill the above requirements is a plastisol which includes a polyvinyl chloride resin dispersed in a plasticizer together with additives which make the finished coating resistant to the effects of the ambient atmosphere, ultraviolet radiation, and may also include a coloring agent. The plastisol is the stable, highly viscous phase into which polyvinyl chloride resin is converted when dispersed by mixing and blending into a plasticizer such as di-octylphthalate. The application of heat converts the dispersion to a rubber-like solid by effecting a solution of the resin and plasticizer. This conversion is described as fusing and occurs when the plastisol is heated to the temperature at which it becomes a single homogeneous phase. Additionally, a fire retardant material may be added to improve the desired characteristics of the insulation. The above-described material is elastomeric and closely adheres to the surface of the bus bar in the completed fused stage. It is highly resistant to attack by solutions generally encountered in electroplating which property uniquely allows the coated bar to be immersed in the plating solution as will be explained in detail later.

A presently preferred method which may be employed in producing bus bars 10 coated with a seamless layer of insulation 12 and having a plurality of selected areas 14 which are all ultimately plated with silver 16 includes the following steps. A conductive bar 18 which has bolt holes 20 formed at the ends 22 is prepared for the coating operation by cleaning its surface to remove foreign particles and surface films such as grease or oil which may be on the bar as supplied. The holes 22 are used for interconnection between subsequent lengths of bus bar. When using the presently preferred plastisol material 24, the cleaned bar is heated to a temperature within the gelling range of the plastisol, as for example between 100° F. and 250° F. Gelling may be defined as the increase in viscosity of the material as the solids go into solution in the plasticizer so that the plastisol approaches the solid rubber-like state characteristic of the fused material. The heated bar 18 is immersed edgewise in a tank 26 containing the plastisol 24 which is at room temperature. The completely immersed heated bar is suspended by its ends 22 and is allowed to remain in the bath for a time long enough for the desired thickness of insulation 12 to gel on the surface of the bar. While some plastisol would coat a cool bar it has been found that a greater thickness of insulation can be built up in a single dip by heating the bar to cause gelling. The gelling of the plastisol progresses outwardly from the surface of the bar 18 with the material closest to the bar being more completely converted from the "solid solution" dispersion of resin and plasticizer to the fused state wherein the plasticizer and resin are not mechanically separable. The bar is removed gradually from the tank of insulation, with its broad face vertical. The bar is withdrawn with the longitudinal axis of the bar forming a small acute angle with the surface of the plastisol 24 (see FIG. 2). If the bar were withdrawn with its axis parallel to the surface of the plastisol the material, being rather viscous, would normally form runs or tears on the lower edge of the bar as it is lifted clear of the plastisol surface. The inclination of the withdrawing bar causes the tearing or parting of the meniscus between the bar and the plastisol to proceed along the bar at a continuous rate so that undesired concentrations of the plastisol do not occur. This also allows closer control of the gelling of the material at the edge of the bar that is last-removed from the plastisol. This minimizes variations in insulation thickness at this point. Uniformity in insulation thickness is important for many reasons, as for fitting the molded bus duct insulators in the assembled bus duct.

The withdrawn bar, having its gelled coating thereon, is reheated to the temperature at which fusion of the gelled plastisol occurs. This temperature is in the range of 350° F. to 450° F. The bar is kept at the fusion temperature until the desired conversion has occurred. The fusion operation results in the formation of a highly stable seamless coating on the bar. The fusion process forms a tough, homogeneous, and flexible coating which closely fits the bar but is not adherent to the bar surface. The conversion of the plastisol to its fused state takes place without the addition of a catalyst.

Where a bus bar is to be used for feeder duct, only the end areas 22 are to be free of insulation. This may be arranged in a number of ways. Most directly, bar-supporting clamps may be assembled to end areas 22 of the bar, such clamps covering and thus masking the areas 22 that are to be bare. Such clamps provide convenient handling means for the bar, when being immersed as in FIG. 2 and during the subsequent fusion treatment. The fused plastisol that adheres to the clamps may be readily stripped preparatory to use with each new bus bar to be coated.

The insulation as applied above can be cut and stripped away from any area that is to be bare. There is normally no surface adhesion. The seamless insulating coating shrinks during the fusion treatment, and since it conforms intimately to the bus bar surface, there is a strong resistance to any force due to mechanical loads (as in riser installation) to slip the bar out of insulation.

The seamless insulation is highly resistant to the solutions employed in electrical plating such as cyanide salts, acids and the like. In carrying out the improved method the insulation is removed from those portions of the bar to which the silver or other highly conductive metal is to be applied. The coating is removed by cutting with a sharp instrument. For example a steel rule cutting die may be used advantageously. The entire bar is then processed in the electroplating operation, resulting in a bar having selected areas such as the plug-in areas 16 and the ends 22 of the bar coated with silver, those areas being the ones from which the insulation 12 had been removed prior to the plating operation. The portions of bar beneath the insulating coating are shielded from the actions of the electroplating process.

When it is desirable to more tightly secure the insulation coating to the bus bar, an adhesive binder 28 may be used. In that case the binder 28 is applied subsequent to the cleaning operation but prior to the application of the plastisol. Vinyl acetate has been found to be a suitable binder. Where areas are to be non-insulated a mask is applied to the bar before the binder coat is applied. The mask may comprise tape 30a having a pressure sensitive adhesive capable of withstanding the binder 28 or metal-foils 30b removably adhered to either or both surfaces of the bar 18. After the binder coating 28 has been placed on the bar the masks 30 may be removed and the coating process continued as outlined heretofore.

The insulating material 12 is removed from the masked areas of the bars by cutting. The masks 30a and 30b may remain on the bar through the dipping operation. They are then covered with insulation, providing relatively easily removed portions thereof. Subsequent removal of the masks reveals bare areas. These bare areas may be used as contact surfaces when the removal of the insulation is performed in the field, thus the versatility of the bus bar system is increased. Masks 30a and 30b may be retained to protect the surface of the bar 18 when the fused plastisol coating is removed from the bar. However, in the presently preferred embodiment the masks 30a or 30b are removed prior to the plastisol coating operation. The fused plastisol is easily removed from the previously masked area by cutting but strongly adheres to the bar elsewhere. The bar is then processed through the electroplating operation to plate the exposed areas as previously described.

Pigment of contrasting color may be added to the adhesive binder 28. In that case the area on which the masks 30 were placed and subsequently removed will be a different color in the final bus bar 10 since a typical coating of the insulating material 12 is between .025 and .040 inch thick and is translucent in part. The binder may also be applied in a patterned array as by stenciling.

In another embodiment of the invention the insulating coating 12 is applied to the bar 18 by spraying the plastisol 24 on to the heated bar to produce the initial gelling and buildup. Subsequently the bar is heated to the fusion temperature to convert the plastisol to a homogeneous elastomer. The coated bar may then be processed as heretofore described.

While several embodiments of the invention have been shown and described it will be apparent to those skilled in the art that various changes and modifications may be made without departing from the spirit and scope of the invention.

What is claimed is:

1. The process of manufacturing bus bars including the steps of masking selected areas of said bus bar by application of discrete masks to said bar, applying an insulating coating to said bus bar, removing said coating and said masks from said selected areas, and applying a layer of high electrical conductivity metal to said selected areas.

2. The process of manufacturing bus bars including the steps of masking selected areas of said bus bar by applicaiton of discrete masks to said bar, applying an adhesive binder to the masks and exposed portions of said bus bar, removing said binder-bearing masks from said selected areas, applying an insulating coating to said bus bar which adheres to said binder coating on said bar, removing said insulating coating from said selected areas, and applying a layer of high electrical conductivity metal to said selected areas.

3. The process of manufacturing bus bars including the steps of masking selected areas of said bus bar by application of discrete masks to said bar, applying an insulating coating to said mask-bearing bus bar by dipping said bar in a heat fusible thermoplastic material, fusing said material into a seamless coating on said bus bar, removing said coating and said masks from said selected areas, and applying a layer of high electrical conductivity metal to said selected areas.

4. The process of manufacturing bus bars including the steps of applying an adhesive binder to said bus bars in a patterned array to provide binder-coated and non-coated areas, applying an insulating coating to said bus bar by dipping said bar in a heat fusible material and fusing said material into a seamless coating on said bus bar, removing said insulation from said bus bar in accordance with the non-coated areas of said patterned array of said binder, and applying a layer of high electrical conductivity metal on the uncoated areas.

5. The process for producing insulated bus bars comprising a highly conductive member having a seamless layer of insulating material formed of fused plastisol, said bus bar having selected non-insulated areas comprising the steps of cleaning the bars, indirectly heating the bar to a temperature within the gelling range of the plastisol, immersing the heated bar in the heat-fusible plastisol to produce gelling of a layer of plastisol on the bar, indirectly heating the coated bar to a temperature within the fusing range of the plastisol and retaining the bar at said temperature until said plastisol has fused into a single homogeneous phase, and stripping said fused coating from selected areas to produce bare areas.

6. The process for producing insulated bus bars comprising a highly conductive member having a seamless layer of insulating material formed of fused plastisol thereon, said bar having selected non-insulated areas comprising the steps of cleaning the bars, masking those areas of the bar which are to be non-insulated by application of discrete masks to said bar, coating the masked bar with a layer of adhesive binder, removing the binder coated masks to produce selected areas free of binder, heating the bar to a temperature within the gelling range of the plastisol, immersing the heated bar in the heat-fusible plastisol to produce gelling of a layer of plastisol on the bar, heating the coated bar to a temperature within the fusing range of the plastisol and retaining the bar at said temperature until said plastisol has fused into a single homogeneous phase, stripping said fused plastisol from selected ones of said binder free areas to produce bare areas, and applying a layer of high electrical conductivity metal to the uncoated areas.

7. The process for producing insulated bus bars comprising a long relatively thin conductive member having a broad face and a narrow face, said member having an elastomeric coating of fused plastisol insulating material thereon, said bus bar having selected non-insulated portions including the steps of cleaning the bars, heating the bar to a temperature within the gelling range of the plastisol, immersing the heated bar in the heat fusible plastisol with the longitudinal axis of the bar parallel to the surface of the plastisol and with the broad face perpendicular thereto to produce gelling of a layer of liquid plastisol on the heated bar, withdrawing the bar from the plastisol with the longitudinal axis of the bar forming a small acute angle with the surface of the plastisol to provide uniform tearing of the meniscus surface of the plastisol as the bar is removed therefrom, heating the coated bar to a temperature within the fusing range of the plastisol and retaining the bar at said temperature until said layer of plastisol has fused into a single homogeneous phase, stripping the fused coating from said selected portions to produce bare portions, and electroplating a layer of high electrical conductivity metal on the bare portions of said bus bar.

8. The process of manufacturing bus bars including the steps of masking selected areas of said bus bar, applying an adhesive binder to the unmasked areas of said bus bar, applying an insulating coating to said bus bar, and removing said masks and said insulating coating from said selected areas.

References Cited in the file of this patent

UNITED STATES PATENTS

| 2,107,412 | Frank | Feb. 8, 1938 |
| 2,195,231 | Weder | Mar. 26, 1940 |
| 2,453,314 | Hammerly | Nov. 9, 1948 |
| 2,849,350 | Roach | Aug. 26, 1958 |
| 2,949,592 | Smiley | Aug. 16, 1960 |

OTHER REFERENCES

Payne, H. F.: Organic Coating Technology, volume I, Wiley and Sons, Inc., 1954, pages 515–18 relied upon.